No. 763,633. Patented June 28, 1904.

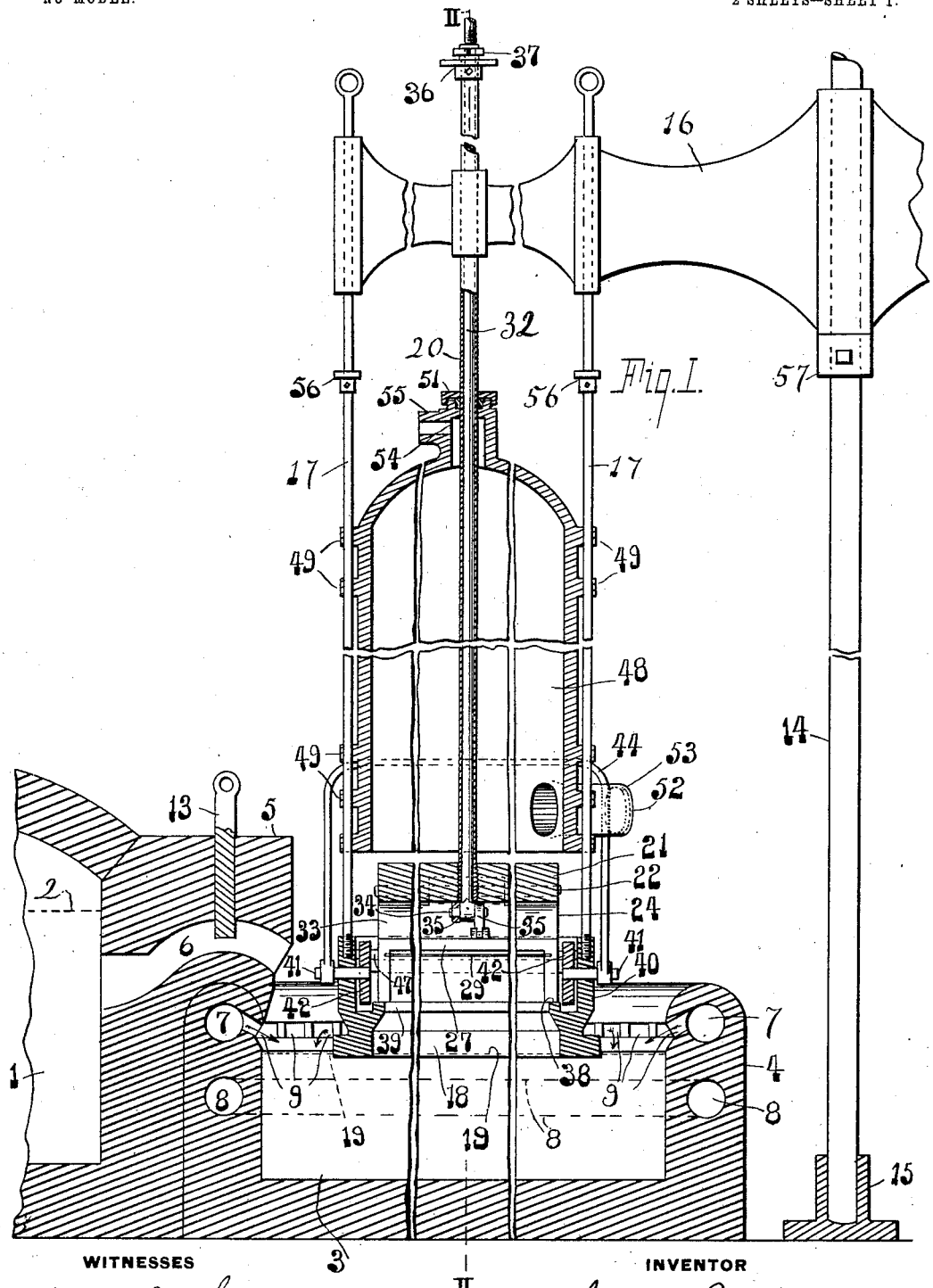

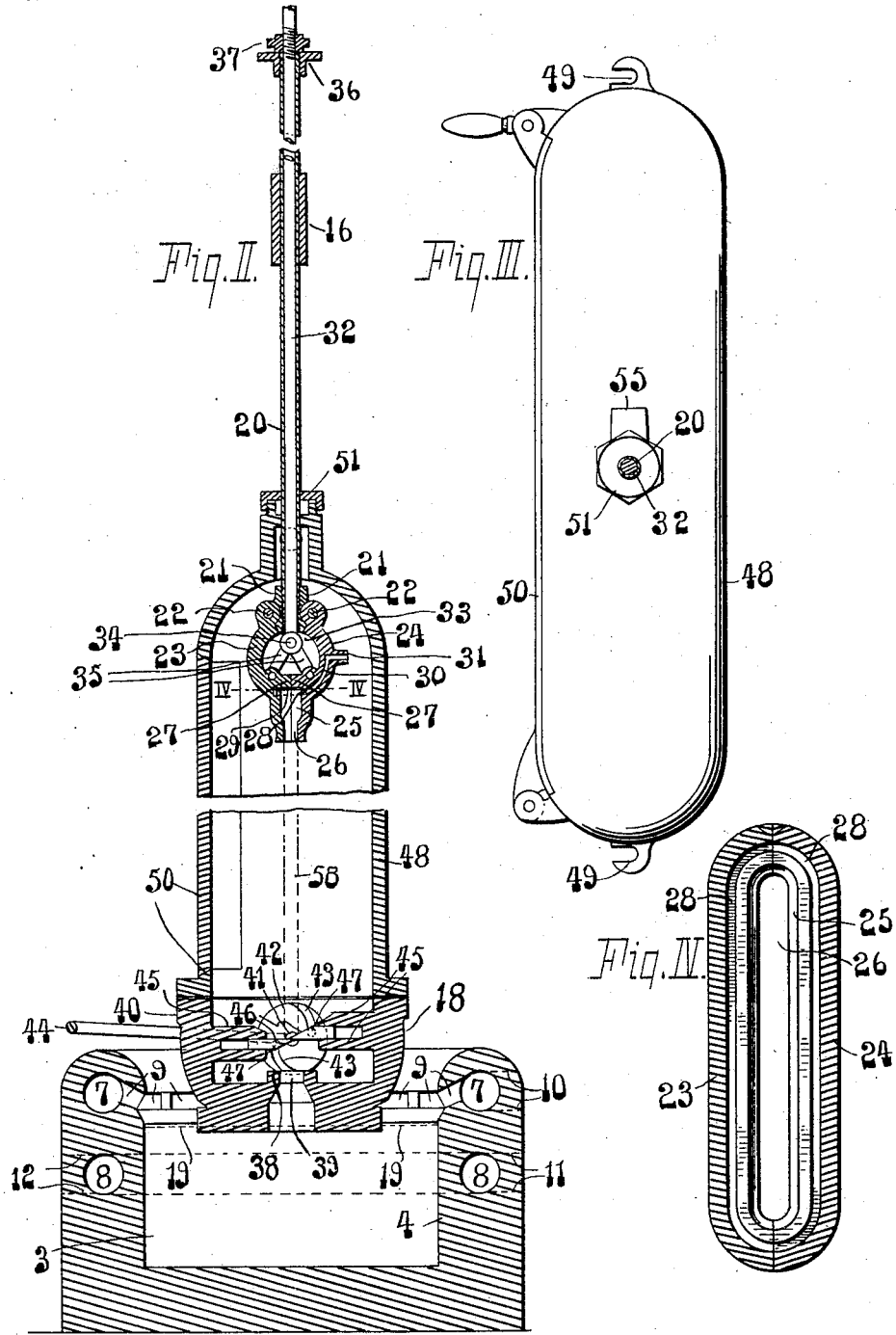

UNITED STATES PATENT OFFICE.

JULIUS PROEGER, OF GREENSBURG, PENNSYLVANIA.

APPARATUS FOR MAKING GLASS SHEETS.

SPECIFICATION forming part of Letters Patent No. 763,633, dated June 28, 1904.

Application filed May 8, 1903. Serial No. 156,158. (No model.)

*To all whom it may concern:*

Be it known that I, JULIUS PROEGER, a citizen of the United States, residing at Greensburg, in the county of Washington and State of Pennsylvania, have invented or discovered new and useful Improvements in Apparatus for Making Glass Sheets, of which the following is a specification.

My invention relates to mechanism for making sheets of glass.

It has been proposed to make sheet-glass by drawing upwardly from a pot of molten glass a cylinder of glass attached to the end of an annular punty and then opening the cylinder into a flat sheet in the usual manner. By my apparatus I can draw from the pot of molten glass flat sheets of glass. Heretofore it has been impracticable to do this, as the sheet would become narrower and narrower as the sheet became longer until finally it would taper to a thread. I preferably employ pneumatic pressure on the surface of the glass to support the weight of the glass and to assist the glass to rise, so that the sheet will retain its original width and thickness, and preferably use pneumatic pressure to form an initial portion of the article by means of which portion the remainder of the article may be drawn.

In the drawings which form a part of my specification, Figure I is a central vertical section of an apparatus showing one form which my invention may assume; Fig. II, a vertical section through the line II II of Fig. I; Fig. III, a plan view of the cage or receiver, and Fig. IV a horizontal section on the line IV IV of Fig. II.

Referring to the drawings, 1 represents the refining end of the glass-tank, the dotted line 2 showing the normal surface of the molten glass.

3 is the glass-pot, having the vertical oblong wall 4 fitting on one side under the lip 5 of the tank 1, as shown on Fig. I. A passage 6, situated below the scum-line of the glass in the tank, leads the glass from the tank 1 through the lip 5, whence it flows down into the pot 3. The pot 3 has two passages 7 and 8 in its wall 4, the upper one, 7, opening by numerous ports 9 downwardly into the upper part of the pot above the level of the glass. Into these passages 7 and 8 burning gas is passed by way of the ports 10 and 11, (shown in dotted lines in Fig. II,) the hot gas passing out of the passage 7 by way of the ports 9 and out of the passage 8 by way of the port 12. (Shown in dotted lines on Fig. II.) The hot gas keeps the glass in the pot at the proper temperature. The passage 6 is provided with the vertically-sliding gate 13, which regulates the flow of glass into the pot 3.

On a post 14 seated in the socket 15 (the support for the top end of the post not being shown) is the bracket or arm 16, which carries the two spaced vertical die carrier-rods 17, supporting at their lower ends the elongated shell or die 18, whose lower end is, as shown in Fig. II, slightly below the surface of the glass, the surface being indicated by the dotted line 19.

Between the rods 17 and slidably supported in the bracket 16 is a tubular rod 20, supporting at its lower end a head 21, on which are pivoted at 22 22 the two jaws 23 and 24. The lower ends of these jaws are provided with cavities which when the jaws are closed register and form the large cavity 25, which is restricted at its lower portion 26, so that in cross-section the cavity 25 resembles the body of a bottle and the portion 26 the neck thereof. The cavity 25 is as long as the sheet of glass to be made is wide, while the portion 26 is approximately of the thickness of the sheet. The upper end of the cavity 25 is closed by the contiguous flanges 27 on the jaws 23 and 24 when the latter are closed.

Just beneath the flanges 27 is an endless channel 28, one-half thereof being in the wall of each jaw, which channel is connected all the way around it to the upper end of the cavity 25 by means of a narrow horizontal slit or slot 29. One of the jaws, as 24, is provided with a passage 30, which opens into the channel 28. This passage is connected at its upper portion to the tubular projection or nipple 31.

Slidable within the rod 20 is the rod 32, which extends down into the space or cavity 33 between the jaws 23 and 24 and above the flanges 27. The lower end of the rod 32 carries by a pivot or pin 34 the links 35, whose lower ends are attached pivotally to the respective jaws and form a toggle by which the jaws can be opened or closed. The upper end of the rod 20 carries a collar 36, on which is seated a nut 37, threaded on the rod 32, by which the toggle-links may be operated to open and close the jaws.

The shell or die 18 has a small upstanding seat, flange, or rim 38 next to the long die-slot 39 therein, and spaced from said small seat and lying behind the same is a higher seat, flange, or rim 40 on the shell or die, to which the carrier-rods are fastened. The seat 38 lies beneath the jaws 23 and 24, so that when the closed jaws are lowered onto it the portion 26 of the cavity 25 and the die-slot 39 will lie mouth to mouth, the portion 26 of the cavity 25 being slightly smaller than the seat 38, as shown on Fig. I.

Journaled in opposite end portions of the rim 40 are two alined rock-shafts or pins 41, which carry on their inner ends, next to the inner wall of the rim 40, cam-disks 42, each provided on its inner side face with two curved cam-grooves 43, which run from the periphery thereof on opposite sides of the center eccentrically, so that their closed extremities lie on opposite sides of the center of the disk. The outer ends of the rock-shafts or pins 41 are connected by the bail or double crank 44, by which the disks are oscillated.

Slidable in pairs of guides 45, attached to the inner side portions of the rim or seat 40, are two knives 46, having fastened in their ends the pins 47, which lie in the cam-grooves 43 of the disks 42.

Slidable on the rod 20 is the receiver or bell 48, which is guided on the rods 17 by means of the open ears 49. This receiver fits closely on the seat or rim 40, so as to make an air-tight joint, and has a large air-tight door 50, as wide as or wider than the sheets of glass to be made. The receiver has a stuffing-box 51 for the rod 20 and a sight-tube 52 secured to one side and near the bottom thereof. A pane of glass 53 (shown in dotted lines in Fig. I) is secured in the outer end of the tube 52. The upper end of the receiver contains a passage 54, which connects the interior of the receiver with a vacuum apparatus (not shown) having a hose attached to the lug or nipple 55.

The dotted lines 58 represent a sheet of glass held in the jaws 23 and 24.

The rods 17 have adjustable stop-collars 56 for the receiver, and the rod 14 has a collar 57, on which the bracket 16 rests.

The operation is as follows: The glass in the tank 1 is maintained at a constant level, as at 2, and allowed to flow over into the pot 3, where it is maintained at a constant level, as at 19, the flow being adjusted from time to time by the gate 13 in an obvious manner. The bell or receiver is raised, as shown in Fig. I, and the jaws 23 and 24 are closed by means of the nut 37, as is plain, and then lowered down upon the seat or rim 38, as shown in Fig. I, where one jaw, 24, is so lowered. A hose is attached to the nipple 31, and a vacuum apparatus (not shown) exhausts the air in the cavity 25, causing the external pressure of the air on the glass in the pot 3 to force the glass up into the long narrow-shouldered cavity 25, the slit 29 being too narrow to permit the glass to pass through it. Thus a shouldered edge is formed on the glass which must in the drawing of the glass remain attached to the jaws, which constitute a drawing-head. The hose is now detached from the nipple 31, and the receiver is lowered on the seat 40 and the air therein exhausted through the passage 54, a hose having been previously connected to the nipple 55 and the vacuum apparatus. The rod 20 is then drawn up, carrying with it the jaws 23 and 24, with the sheet of glass 58 attached thereto. The attendant watches the drawing operation through the sight-tube 52, so that he can regulate or give directions for regulating the various movements and steps taking place. During the step just detailed the weight of the sheet is partially supported by the external pressure of the atmosphere and the thickness and width of the glass maintained at their original dimensions. When the glass sheet reaches the required height, the action is stopped in the bell and the bail 44 is pulled down to a horizontal position, whereby the cam-disks force the knives 46 together, which sever the sheet from the pendent mass of glass. The door 50 is then opened, through which the sheet of glass, having been previously released by pushing the rod 32 down in the rod 20, is removed. The door is again closed, and the operation above detailed is repeated for each sheet of glass.

The bracket 16 may be swung on the rod 14, conveying with it the attached parts when lifted so as to clear the pot 3, the stops 56 arresting the upward movement of the rods 17 by their engagement with the bracket 16.

While I have shown specific mechanism for making sheet-glass, I do not thereby limit myself to the same, as many modifications therein can be devised which while not resembling it nevertheless embody its essential features. Some parts may be omitted—for example, the receiver or bell 48. I believe myself entitled to the claims presented herein interpreted as broadly as possible in view of the state of the art without limitation to specific mechanism, except when the prior art requires the same.

My invention is not restricted to the making of sheets, as by the same principles articles of various shapes can be made.

Having described my invention, I claim—

1. In a glass-making apparatus, means for forming from a bath of molten glass an initial portion of an article by vacuum action, and means for drawing from the bath another portion of the article attached to said initial portion.

2. In a glass-making apparatus, means for forming from a bath of molten glass an initial portion of an article by pneumatic pressure, and means involving pneumatic pressure for drawing from the bath another portion of the article attached to said initial portion.

3. In a glass-making apparatus, means for forming from a bath of molten glass an initial portion of an article by pneumatic pressure, means, both mechanical and pneumatic, for drawing from the bath another portion of the article attached to said initial portion.

4. In a glass-making apparatus, a sectional head for drawing glass from a bath of molten glass, having a shouldered cavity in which an initial portion of an article is cast, and means for causing the glass to enter said cavity.

5. In a glass-making apparatus, a sectional head for drawing glass from a bath of molten glass having therein a shouldered cavity in which an initial portion of an article is cast, and pneumatic means for causing the glass to enter said cavity.

6. In a glass-making apparatus, a sectional head for drawing glass from a bath of molten glass, the sections being pivotally mounted, means for bringing the sections together, the sections having when so brought together a cavity in which an initial portion of an article is formed, and means causing the glass to enter said cavity.

7. In a glass-making apparatus, means for drawing glass from a bath of molten glass, and a vacuum-receiver inclosing the drawing means and the glass article being formed.

8. In a glass-making apparatus, a vacuum-receiver and means therein for drawing glass from a bath of molten glass.

9. In a glass-making apparatus, a vacuum-receiver, means for forming a glass article therein, said receiver having a door, through which the article may be removed.

10. In a glass-casting apparatus, a pair of jaws having, when closed, a cavity, provided with means for forming and retaining an initial portion of an article therein during the subsequent operation of drawing upwardly from a bath of molten glass.

11. In a glass-making apparatus, means for drawing an initial portion of an article from a bath of molten glass by vacuum action, means for drawing from the bath another portion of the article attached to said initial portion, and means for severing the drawn glass from the mass pendent thereon.

Signed at Pittsburg, Pennsylvania, this 4th day of May, 1903.

JULIUS PROEGER.

Witnesses:
F. N. BARBER,
A. M. STEEN.